United States Patent [19]

Lutz

[11] 4,372,693

[45] Feb. 8, 1983

[54] TEMPERATURE EXCURSION SENSING AND LOCATING APPARATUS

[75] Inventor: Michael A. Lutz, San Carlos, Calif.

[73] Assignee: Raychem Corporation, Menlo Park, Calif.

[21] Appl. No.: 229,913

[22] Filed: Jan. 30, 1981

[51] Int. Cl.³ .................... G01K 7/00; G08B 17/00
[52] U.S. Cl. .................. 374/111; 324/52; 340/594; 374/170; 374/184
[58] Field of Search ............ 73/342, 362 R; 338/214; 324/52; 174/11 R; 361/282; 340/596, 594; 337/415; 374/111, 184

[56] References Cited

U.S. PATENT DOCUMENTS

| | | | |
|---|---|---|---|
| 0,733,184 | 7/1903 | Gould | 337/415 |
| 1,968,534 | 7/1934 | Megow | 374/111 |
| 2,985,870 | 5/1961 | Lindberg, Jr. | 374/111 |
| 3,257,607 | 6/1966 | Pintel | 361/282 X |
| 3,493,913 | 2/1970 | Wagner | 361/282 X |
| 3,786,461 | 1/1974 | Jamison | 340/594 X |
| 4,041,771 | 8/1977 | Allan et al. | 73/40.5 |
| 4,103,225 | 7/1978 | Stephens | 324/52 |
| 4,134,092 | 1/1979 | Lavigne et al. | 337/415 |
| 4,246,468 | 1/1981 | Horsma | 73/362 AR X |

FOREIGN PATENT DOCUMENTS

740884 11/1955 Australia ............................ 340/596

*Primary Examiner*—Daniel M. Yasich
*Attorney, Agent, or Firm*—James W. Peterson

[57] ABSTRACT

A temperature excursion sensor and locator consisting of a temperature sensitive cable which includes two electrical conductors separated by a dielectric member to form a linear strip capacitor wherein at least one of the conductors is comprised of a number of thermostatic devices connected serially. An over or under temperature excursion is sensed and located by the cable when it is connected from either end to control electronics by measuring the capacitance of the cable. Under normal conditions, all of the thermostatic devices are electrically conducting and the control electronics measures the full capacitance. Upon occurrence of a temperature excursion, one or more thermostatic devices become non-conductive and the resulting measured capacitance is proportionately reduced. Presence of the temperature excursion is sensed and its location indicated by the control electronics which compares the full cable capacitance to the reduced capacitance, the ratio of said capacitances determining the location of the temperature excursion.

8 Claims, 4 Drawing Figures

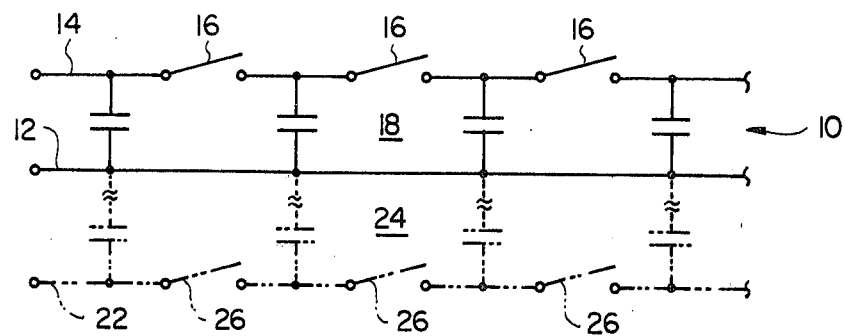
FIG_1
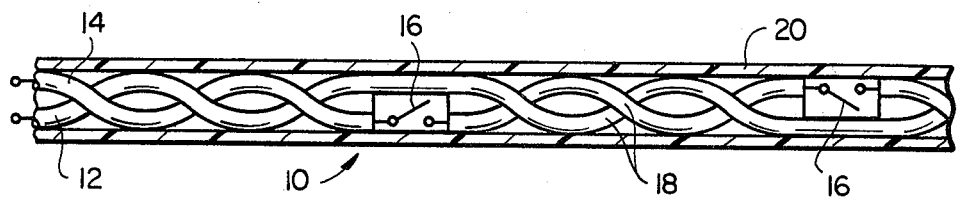
FIG_2
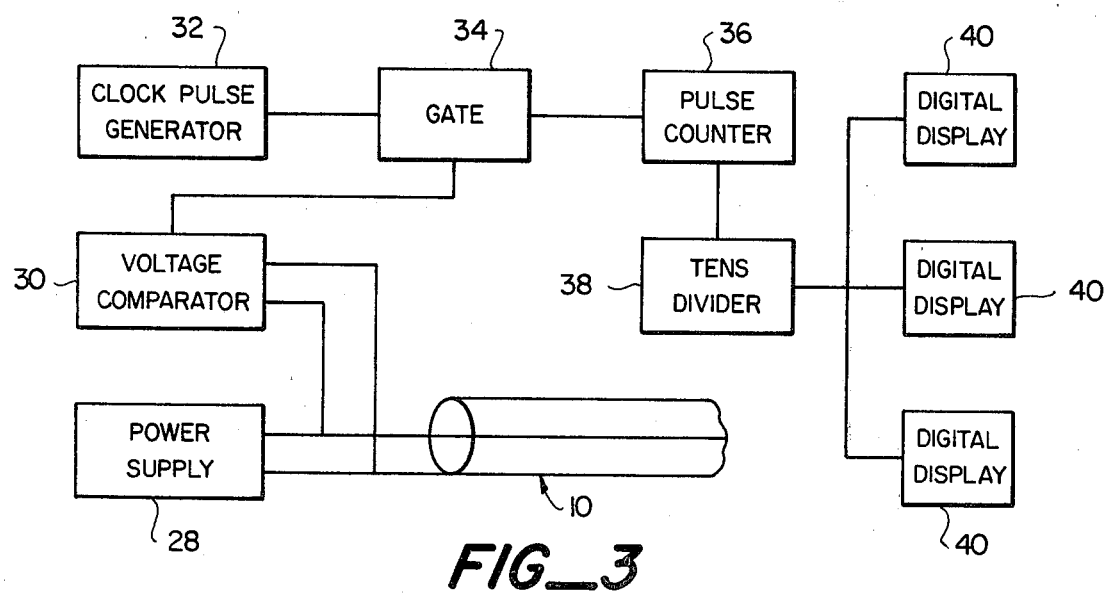
FIG_3
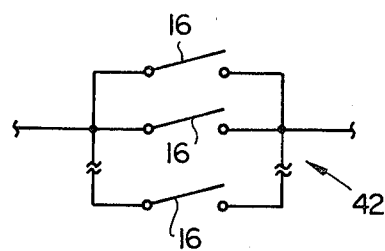
FIG_4

TEMPERATURE EXCURSION SENSING AND LOCATING APPARATUS

BACKGROUND OF THE INVENTION

Over temperature and under temperature detection are important for the protection of personnel, equipment, and agricultural crops. Electronic equipment will fail if allowed to exceed specified maximum and minimum temperatures. Incipient mechanical equipment failure can be detected by sensing overheating and shutting down the equipment. Ammunition dumps, power cables, coal conveyors, etc. must all be operated below maximum temperature levels to avoid damage. Agricultural crops must be kept from freezing to survive. Certain chemical processes and fluid transport pipes must be kept at temperatures well above ambient to avoid adverse chemical reactions or increased viscosity. These are but a few examples of extended or spatially distributed systems where knowledge of undesirable temperature excursions is essential.

Heating and cooling systems are often provided to avoid undesirable temperature excursions. Such systems, however, are generally energy intensive, and, with the advent of the energy crisis, expensive to operate. Furthermore, heating and cooling systems are often operated when they are not needed due to the lack of over- or under-temperature information. Finally, such systems often fail without warning and without any indication to the user, resulting in undesirable temperature excursions which often lead to catastrophic failures and safety hazards.

Temperature excursions are conventionally measured by a number of devices which change a physical property with temperature. Perhaps the simplest device is the thermostatic switch or thermostat which either opens or closes an electrical circuit when the temperature rises above or falls below a predetermined value. The thermostat is a discrete device but has been used to monitor extended or spatially distributed systems for temperature excursions through the use of multiplexing or by running individual wires to each of the thermostats. Multiplexing requires an electronic circuit and electrical power at the location of each thermostat to encode the information for transmission. The use of individual wires produces a heavy, inflexible, expensive, and generally impractical cable when large numbers of thermostats are required.

The instant invention improves over the above described techniques by providing a light, flexible cable containing only two conductors and thermostatic devices distributed along the length of the cable, encased within an environmentally resistant jacket. Multiplexing circuits and individual wires are no longer necessary to detect and locate a temperature excursion.

The above discussion was confined to cables containing discrete temperature sensitive devices. There also exists another class of linear temperature sensors which does not utilize discrete devices but rather utilizes continuously distributed temperature sensitive material. The major advantage of the latter class is the ability of the sensor to detect an abnormal temperature excursion at any location along its length, as opposed to discrete locations.

There are at least five types of continuously distributed over temperature sensors including: meltable plastics, thermistors, eutectic salts, pneumatics and conductive polymeric compositions. Meltable plastic sensors utilize a twisted pair of wires, each wire encased in meltable plastic material. When the temperature exceeds the material's melting point, the wires touch. To reuse the sensor, the shorted section must be cut out and replaced. A continuous thermistor comprises a continuous negative temperature co-efficient of resistivity material. As the temperature of a sensor made from such material rises, the resistance between two conductors falls. Once the temperature falls, the resistance returns to its original high value. Eutectic salt type sensors utilize a salt compound between two conductors. At the eutectic temperature, the compound melts and its resistance falls connecting the conductors. When the temperature falls, the compound solidifies and the resistance returns to its original high value. In pneumatic devices a tube is pressurized with an inert gas. The application of heat causes an increase in pressure which operates a diaphragm that closes an electrical contact. Upon removing the heat, the pressure falls and the contact reopens. Continuous conductive polymeric composition devices are disclosed in my earlier U.S. patent application Ser. Nos. 88,344, 134,354 (both now abandoned) and 184,647 wherein a conductive polymeric composition is used as a conductor which becomes electrically discontinuous upon exposure to over-temperature.

In exchange for the ability to detect an over-temperature excursion at any location along its length, the principles utilized in the above mentioned devices place fundamental limitations on the construction and performance of distributed sensors which do not exist in the instant invention. The meltable plastic sensor can only be used once and is therefore unsuitable as a monitor where over-temperatures frequently occur, or where the sensor is not easily accessible. The thermistor, eutectic salt, and pneumatic sensors are all metal encased and therefore relatively inflexible and subject to corrosion. In addition, the resistance change is not sharp for the thermistor material and the pressure change is gradual for the pneumatic device making these sensors relatively imprecise. In these devices and in the conductive polymeric composition devices, the number of sensing temperatures is limited by available materials and generally only one sensing temperature for the entire sensor length is provided. In the instant invention discrete thermostats may be selected for any particular temperature, said thermostats being capable of detecting either rise or fall of temperature and therefore capable of detecting both over and under temperature excursions. In conductive polymer type devices the operational length of the device is to some degree limited by relatively low polymer conductivity whereas in the instant invention higher conductivity materials such as copper may be used to interconnect discrete devices over tremendous lengths. Finally, high accuracy is achieved in over or under temperature sensing by the ability to use individual thermostats, ie., switches, which are triggered at precise temperatures, provide huge resistance changes, and have extremely stable trip temperatures over long periods of time.

One type of continuously distributed under temperature sensor is described in U.S. Pat. No. 4,041,771. This patent describes a sensor consisting of an elongated container which holds a body of material which changes phases at specific temperatures. Specifically, the patent discloses a tube of liquid which changes conductivity upon freezing and thereby changes the capacitance of the sensor. The use of a liquid to solid phase-changing material limits such a device to only the structure disclosed, namely a liquid within a dielectric tube surrounded by a conductor.

In exchange for the ability to detect an under temperature excursion at any location along its length, the use of a liquid to solid transition places fundamental limitations on the construction and performance of sensors which do not exist in the instant invention. First, the use of liquids in tubes limits the flexibility, ruggedness, and durability of the sensor. Second, placing the thermally sensitive material (liquid) on the inside of a co-axial sensor slows the response of the sensor to temperature changes. Third, the magnitude of liquid to solid resistance changes is far less than for electrical switches such as thermostats. For example, for the pure water (18° C.) to ice ($-4°$ C.) transition, the resistance change is only one order of magnitude. (See "International Critical Tables of Numerical Data, Physics, Chemistry and Technology", Volume VI, Mc-Graw-Hill Book Company, Inc., 1929, page 152). This makes precise fault location practically impossible even in short sensor lengths. Fourth, the number of sensing temperatures is limited by available liquid to solid transitions. Fifth, use of insoluble mixtures to achieve transition temperatures unavailable with true solutions is impractical because of the inability to maintain solution homogeneity over the life of the sensor.

The instant invention provides for the use of numerous thermostatic devices without attendant multiplexing circuitry or large numbers of wires so that the sensor cable need not contain large, insensitive intervals. Indeed, these intervals can be made arbitrarily small, the spacing being dictated primarily by economic trade-offs. The result is, for all practical purposes, a sensor cable with none of the disadvantages listed above for continuous sensors, but with a large number of advantages. First, a single cable can serve as both an under and over temperature sensor and locator at different points along its length by choosing thermostatic devices which open on increasing temperature for over temperature sensing and open on decreasing temperature for under temperature sensing. Second, one cable can have various temperature trip points along its length through the use of thermostatic devices with different temperature trip points. Third, innumerable temperature trip points exist with commercially available thermostatic devices. (Sunstrand Data Control catalog is illustrative, showing thermostats available with trip points in the range of $-60°$ C. to 315° C.). Fourth, thermostatic devices exhibit a huge resistance increase upon opening which when combined with the capacitance measuring technique, makes possible location of the temperature excursion with great accuracy. Fifth, thermostatic devices, upon opening, do so without a gradual increase in resistance which makes possible unambiguous capacitance readings and reliable operation.

OBJECTS OF THE INVENTION

A primary object of the instant invention is to provide an instrument for sensing and locating temperature excursions.

Another object of the instant invention is to provide a sensing cable which is lightweight, flexible, of small size and that is useful and accurate in great lengths.

Yet another object of the instant invention is to provide an under temperature and/or over temperature monitor which can be cycled repeatedly.

A further object of the instant invention is to provide a sensor cable that can have various and numerous precise temperature trip points along its length and over a wide range of temperatures.

Still another object of the instant invention is to provide a sensor cable which is easily modified, spliced, or repaired in the field.

And still another object of the instant invention is to provide an instrument that is relatively insensitive to normal resistance variations along its length due to aging, imperfections in manufacture, splicing or interconnecting.

Further objects and advantages of the instant invention will become apparent from a consideration of the drawing.

SUMMARY OF THE INVENTION

The purpose of the instant invention is to sense and locate a temperature excursion from a predetermined temperature. To accomplish this purpose, the invention provides a sensing cable and complementary electronics wherein the sensing cable comprises two electrical conductors running the full length of the cable wherein at least one of the electrical conductors is comprised of a plurality of serially connected thermostatic devices distributed along the length of the cable, and a dielectric member such as insulation between said conductors to form a linear strip capacitor. The thermostatic devices are chosen so that they are electrically conducting when the temperature is in the normal range but electrically insulating when a temperature excursion occurs. The cable capacitance is periodically measured by the complementary electronics at one end of the cable. Under normal conditions, the full cable capacitance is measured and the full cable length is displayed by the electronics. At the predetermined temperature excursion the cable capacitance is reduced in proportion to the distance along the cable to the insulating thermostatic device which has been triggered. The complementary electronics compares the full cable capacitance and the reduced capacitance arriving at a ratio which determines the location of the predetermined temperature excursion. When the temperature returns to normal, the open thermostatic device recloses and the full cable capacitance is measured once again.

DESCRIPTION OF THE DRAWING

FIG. 1 illustrates in schematic form the equivalent circuit of a portion of the sensing cable and further illustrates in phantom an optional tandem circuit.

FIG. 2 illustrates a partial longitudinal-sectional view of a portion of the sensing cable illustrated in FIG. 1.

FIG. 3 illustrates in block diagram form a capacitance measuring circuit that may be utilized for the sensing cable illustrated in FIGS. 1 and 2.

FIG. 4 illustrates in schematic form the use of additional thermostatic devices which improve statistical reliability and accuracy.

DETAILED DESCRIPTION OF THE INVENTION

With reference to the drawing, FIG. 1 illustrates in schematic form the cable of the instant invention generally denoted by the numeral 10, comprising a first electrical conductor 12, a second electrical conductor 14, including a plurality of thermostatic devices 16, and a dielectric member 18 illustrated as a plurality of capacitors which interconnect the first and second electrical conductors.

Electrical conductors 12 and 14 utilize conductive materials such as copper which allow the apparatus to operate over great distances as compared to my earlier inventions which are to some degree limited by the inherent conductivity of a conductive polymer composition. Highly conductive materials may be utilized in a variety of gauges of solid, stranded, or flat strip conductors as is desirable.

Thermostatic sensors 16 are preferably thermostats which either open or close an electrical circuit when temperatures either rise or fall below a predetermined value.

There are a number of possible configurations for disposing dielectric member 18 between first and second electrical conductors 12 and 14. As schematically suggested, discrete capacitors may be used instead of relying solely on the distributed capacitance between two conductors. For example, a dielectric material may be set between the conductive members in layer form. Additionally, the dielectric may be the insulation around one or both of the conductive members themselves instead of a separate layer. Particular dielectrics are utilized to withstand the particular temperatures or chemical exposures desired. The term dielectric member is understood to include continuous insulating layers or discrete capacitors.

FIG. 2 illustrates a partial longitudinal-sectional view of the cable 10 comprising first electrical conductor 12 and second electrical conductor 14, each of said conductors individually insulated, said insulations constituting a dielectric member 18. Electrical conductors 12 and 14 are shown in a twisted pair arrangement but it is of course possible that other configurations of conductors may be used wherein the conductive members are coaxial or parallel to each other. Thermostatic devices 16 are generally shown to be distributed along the length of second electrical conductor 14 and a jacket 20 is provided around the various components to encase and environmentally protect the internal components. It is understood that thermostatic devices may be distributed along first conductor 12 since electrical disruption of either conductor will effect a reduction in measurable capacitance. In order to sense a predetermined temperature condition, the jacketing material must have a thermal conductivity sufficiently high to insure satisfactory thermal response to the outside temperature changes to be detected by thermostatic devices 16.

In addition to environmental protection, the jacket must provide enough physical strength to protect the internal conductors and thermostatic devices from abuse while possessing enough tensile strength to allow for winding on reels and pulling through conduit. In more rugged applications, first electrical conductor 14 may be increased in diameter to become a structural member as well as an electrical conductor. Additional structural members (not shown), not a part of the electrical circuit, may be added to the apparatus to provide structural strength.

The thermostatic devices 16 may be chosen to open second electrical conductor 14 on rising temperature to detect an over temperature excursion, or to open second electrical conductor 14 on falling temperature, to detect an under temperature excursion. These devices may be spaced uniformly or non-uniformly along the length of the cable depending upon the type of sensing desired. It can be appreciated that one sensor cable can detect both over and under temperature excursions by alternating thermostatic devices having varied predetermined trip temperatures along the length of the cable depending on the application.

An optional feature of the instant application for sensing both over and under temperature is shown in phantom in FIG. 1 wherein a third electrical conductor 22 may be provided. First electrical conductor 12 becomes a common conductor for the second and third electrical conductors 14 and 22, respectively. An additional or second dielectric member 24 may be disposed between first electrical conductor 12 and third electrical conductor 22. In this embodiment, a tandem temperature excursion sensing and locating apparatus is created by utilizing thermostatic devices 26. It can be appreciated that thermostatic devices 16 and 26 may sense the same predetermined temperature excursion, but more likely will be selected to sense different temperature excursions. This embodiment therefore provides a sensor capable of sensing (1) two over temperature excursions, (2) two under temperature excursions, or (3) both over and under temperature excursions with a three conductor cable and only two kinds of thermostatic devices. It is likewise within the scope of the invention to use additional electrical conductors with additional thermostatic devices which may be used in combination with the common conductor.

FIG. 3 illustrates block diagram form one of the innumerable capacitance measuring circuits which utilize integrated circuitry to measure the time to charge cable 10 by counting clock pulses. Cable charging power supply 28 charges the cable 10 of FIGS. 1 and 2. Voltage comparator 30 turns on when the cable voltage reaches a lower preset voltage $V_L$ and turns off when the cable reaches an upper preset voltage $V_U$. Clock pulse generator 32 is running continuously. Gate 34 passes clock pulses through to pulse counter 36 only when the cable voltage is between $V_L$ and $V_U$. Pulse counter 36 therefore measures the time required to charge cable 10 from $V_L$ to $V_U$ which is proportional to the cable capacitance. Tens divider 38 divides the counted pulses into appropriate decades which are shown digitally on display 40.

Thermostatic devices 16 and 26 shown in FIGS. 1 and 2 may comprise a unit having a plurality of identical thermostatic devices electrically connected in parallel wherein said units are connected serially as thermostatic devices 16, shown in FIGS. 1 and 2. FIG. 4 illustrates such a typical unit shown generally at 42 having a plurality of thermostatic devices 16 connected in parallel. This construction greatly diminishes the probability of failure of the apparatus. It will be appreciated that failure of thermostatic devices 16 in the open position effectively renders useless the remainder of the cable for sensing temperature excursions. Furthermore, failure of a thermostatic device 16 in the open condition gives an erroneous signal. If thermostatic device 16 fails in the closed position, the next thermostatic device is capable of signalling the occurence of a temperature excursion with only a slight decrease in response time. Therefore, failure of thermostatic device 16 in the open position is hereinafter called a critical failure mode. In order to diminish the probability of this critical failure mode, the instant invention provides a plurality of identical thermostatic devices 16 electrically wired in parallel. Even if one of said devices should fail in the open position, the remaining parallel sensors would remain operative, and would continue to detect temperature excursions, preventing the remainder of the cable from being rendered useless. It can be appreciated by one having ordinary skill in the science of statistics that having a plurality of parallel thermostatic devices such as shown in FIG. 4 significantly decreases the probability of failure in the critical mode. Having described the components and the interrelationship of the components of the instant invention, the operation of the apparatus will now be discussed.

To sense and locate temperature excursions in extended or spatially distributed systems, a suitable sensor cable as described above is manufactured and placed in position. To detect overheating in a buried power transmission cable, the sensor cable is placed in the ditch with the power cable so as to be in close thermal proximity. Once the sensor cable is installed, the control electronics is connected to one end and a reference capacitance value is measured under the condition that all thermostatic devices are electrically closed. In this example, this value would correspond to the power cable being below the critical over temperature value everywhere along its length. This reference capacitance value is electronically stored and the digital display reads 100% of cable length. This calibration having been completed, the control electronics is set to monitor the sensor cable for capacitance decreases from the stored value. Again referring to the power cable example, suppose that the critical over temperature value is exceeded half way down the cable. The thermostatic device closest to the temperature excursion will electrically open, decreasing the sensor cable capacitance to one-half the stored value. This decrease is sensed by the control electronics which closes a relay and displays 50% on the digital display. The relay closure can be used to sound an alarm, shut down power, supply cooling water, etc. This fault condition remains until the component being monitored cools below the over temperature set point allowing the open thermostatic device to reclose, at which time the relay opens and the display once again reads 100%.

Having described the basic operation of the instant invention, there are many details of design and operation which will now be discussed:

First, the response of the instrument is dependent on the spacing of the thermostatic devices. The spacing is determined through a trade-off between the advantages of larger spacing (lower cost, better cable flexibility) and the disadvantages of larger spacings (decreased thermal response time and spatial fault resolution). As a practical matter, thermostatic devices spaced at intervals of one foot or more are generally adequate. This is because the objects being monitored generally exhibit substantial thermal conduction in the axial direction. Thus, a short hot or cold length will be cooled or heated respectively by adjacent regions such that a localized thermal excursion will expand to a longer length before stabilizing. For example, consider a one inch diameter pipe of infinite extent being heated by a strip heater along its length. Failure of the heater over an inch of length will eventually cause a cooler than normal zone over about a foot, depending on specific conditions. Larger pipes produce larger cool zones due to increased axial conduction. In summary, the use of discrete sensors spaced by application-dependent intervals provides adequate response of the sensor.

Second, accuracy of fault location is limited due to variations in capacitance per unit length of the sensor. It is unlikely that the cable capacitance will be linear with cable length to better than about 1% unless very tight manufacturing tolerances are maintained. However, for the vast majority of applications, fault location to 1% or more of cable length is better than is required and 10% is often adequate.

Third, it is possible to hold the location of the fault on the digital display, even after the fault has abated, through the use of conventional electronic circuitry. Holding this information is important so that maintenance personnel arriving on the scene will know the fault location even though corrective measures have long since been taken.

Fourth, the control electronics can serve as the capacitance measuring unit without providing a location display if it is to be operated at a remote location. The control electronics can instead be equipped to provide an electrical signal containing the capacitance (i.e. fault location) information to control centers for monitoring.

Fifth, certain equations govern the operation of the invention. These equations need to be discussed to insure proper operation. Assume a constant interval d between thermostatic devices and an electrical resistance r for each interval, consisting of the conductor resistance for both conductors and the closed resistance of the thermostatic device. For a cable of length L, the total resistance is Lr/d. If the cable capacitance is to be determined by measuring the RC time constant of the cable where C is the cable capacitance and R is a known resistor in the control electronics box, we require $R > 100$ Lr/d to guarantee 1% measurement accuracy. However, R cannot be arbitrarily large because of current leakage through the open thermostatic device and the dielectric (conductor insulation). Defining $R_L$ to be the leakage resistance, we require for 1% accuracy that $R_L > 100$ R or $R_L > 10^4$ Lr/d. Solving for the maximum permissible cable length to achieve 1% measurement accuracy, we find $L < 10^{-4} dR_L/r$. As exemplary values, consider $d = 1$ foot, $r = 0.2$ $\Omega$/ft and $R_L = 10^8$ $\Omega$/ft, then $L < 5 \times 10^4$ feet (about 10 miles). It can be seen that cables of great length are possible due to the high value of $R_L/r$. Herein lies a great advantage of thermostatic devices over other forms of temperature sensitive mechanisms such as liquid to solid phase changes or conductive polymer transitions. There, values of $R_L/r$ are generally either much less than $5 \times 10^8$ (liquid to solid) or this ratio occurs over 25° C. to 50° C. (conductive polymer).

Sixth, when the thermostatic devices are in fact thermostats, particular care must be given to the choice of thermostat as regards its variance and its differential. Variance is the difference in switching temperature from the thermostat to thermostat while differential is the difference between opening and closing temperature (or vice versa) of an individual thermostat. Variances and differentials as low as a few degrees Centigrade are available and should be used for those applications where close temperature tolerances are required.

Seventh, it is possible to make a temperature range monitor by alternating thermostatic devices of two different temperature trip values. The first device class opens the signal line when the temperature rises above the upper limit; the second device class opens the signal line when the temperature falls below the lower limit. Thus, by alternating devices of each class at suitable spacing, the full cable capacitance is measured only when the temperature everywhere is within the allowable range. An under or over temperature condition is signalled by measurement of reduced cable capacitance.

Furthermore, for those cables where axial discrimination of the fault location is accurate enough to determine which sensing device has opened, one knows not only the fault location but also whether it is an under or over temperature fault even though only two conductors have been utilized.

From the foregoing detailed description, it is evident that there are a number of changes, adaptations, and modifications of the present invention which come within the province of those skilled in the art. However, it is intended that all such variations not departing from the spirit of the invention, be considered as within the scope thereof as limited solely by the appended claims.

What is claimed is:

1. Temperature excursion sensing and locating apparatus, comprising:
   a first electrical conductor;
   a second electrical conductor comprising a plurality of serially connected, normally conductive, thermostatic devices for detecting temperature conditions, each of the thermostatic devices opening and thus becoming nonconductive upon detection of a predetermined temperature excursion; and
   a dielectric member disposed between first and second electrical conductors, said first and second electrical conductors and dielectric member having an original capacitance value while the thermostatic devices are conductive and a reduced capacitance value upon detection of the predetermined temperature excursion by a thermostatic device said conductors connectable to a capacitance measuring device which compares the original and reduced capacitance values to determine the presence of a predetermined temperature excursion and the ratio of said capacitance values determining its location.

2. The apparatus as set forth in claim 1 further including:
   a third electrical conductor comprising a plurality of serially connected normally condutive thermostatic devices for detecting temperature conditions, each of the thermostatic devices opening and thus becoming non-conductive upon the detection of a predetermined temperature excursion; and
   a second dielectric member disposed between first and third electrical conductors wherein the first electrical conductor serves as a common conductor for the second and third electrical conductors, said first and third electrical conductors and said second dielectric member having an original capacitance value while the thermostatic devices of said third electrical conductor are conductive and having reduced capacitance value upon detection of a predetermined temperature excursion by a thermostatic device of said third electrical conductor, said conductors connectable to a capacitance measuring device which compares the original capacitance value and the reduced capacitance value of the first and second electrical conductors and alternately compares the original capacitance value and the reduced capacitance of the first and third electrical conductors to determine the presence of the respective predetermined temperature excursions and the ratios of said capacitance values determining their respective locations.

3. The apparatus as set forth in claim 1 or 2 wherein the dielectric members comprise a plurality of discrete capacitors electrically connected in parallel which electrically interconnect the electrical conductors.

4. The apparatus as set forth in claim 2 wherein the thermostatic devices of the second electrical conductor and the thermostatic devices of the third electrical conductor detect predetermined temperature excursions other than the predetermined temperature excursions detected by the thermostatic devices of said second electrical conductor, said thermostatic devices of said second electrical conductor sensing a maximum predetermined temperature excursion and the thermostatic devices of said third electrical conductor sensing a minimum predetermined temperature excursion.

5. The apparatus as set forth in claim 1 or 2 wherein each thermostatic device comprises a unit having a plurality of identical thermostatic devices electrically connected in parallel.

6. The apparatus as set forth in claim 1 or 2 wherein the apparatus is generally in the form of a cable having an exterior jacket means for protecting the internal components from environmental and mechanical damage.

7. The apparatus as set forth in claim 1 wherein the first electrical conductor comprises a plurality of serially connected, normally conductive, thermostatic devices for detecting temperature conditions, each of the thermostatic devices becoming non-conductive upon detection of a predetermined temperature excursion.

8. Temperature excursion, sensing and locating apparatus comprising:
   a first electrical conductor;
   a second electrical conductor comprising a plurality of serially connected, normally conductive thermostatic devices for detecting temperature conditions, each of the thermostatic devices opening and thus becoming non-conductive upon detection of a pre-determined temperature excursion, said thermostatic devices sensing a maximum predetermined temperature excursion;
   a dielectric member disposed between said first and second electrical conductors, said first and second electrical conductive and dielectric member having an original capacitance value while the thermostatic devices are conductive and a reduced capacitance value upon detection of the predetermined temperature excursion by a thermostatic device, said conductors connectable to a capacitance measuring device which compares the original and reduced capacitance values to determine the presence of a predetermined temperature excursion and the ratio of said capacitance values determining its location;
   a third electrical conductor comprising a plurality of serially connected, normally conductive thermostatic devices for detecting temperature conditions, each of the thermostatic devices opening and thus becoming non-conductive upon the detection of a predetermined temperature excursion, said thermostatic devices sensing a minimum predetermined temperature excursion; and
   a second dielectric member disposed between said first and third electrical conductors wherein the first electrical conductor serves as a common conductor for the second and third electrical conductors, said first and third electrical conductors and said second dielectric member having an original capacitance value while the thermostatic devices of said third electrical conductor are conductive and having a reduced capacitance value upon detection of a predetermined temperature excursion by a thermostatic device of said third electrical conductor, said conductors connectable to a capacitance measuring device which compares the original capacitance value and the reduced capacitance value of the first and second electrical conductors and alternately compares the original capacitance value and the reduced capacitance of the first and third electrical conductors to determine the presence of the respective predetermined temperature excursions and the ratios of said capacitance values determining their respective locations.

* * * * *